(12) United States Patent
Du et al.

(10) Patent No.: US 9,142,397 B2
(45) Date of Patent: *Sep. 22, 2015

(54) HIGH COLOR RENDERING INDEX FLUORESCENT LAMP WITH MULTI-LAYER PHOSPHOR COATING

(71) Applicant: GENERAL ELECTRIC COMPANY, Schenectady, NY (US)

(72) Inventors: Fangming Du, Northfield, OH (US); Heidi M. Anderson, Cleveland Heights, OH (US); William Erwin Cohen, Solon, OH (US); Stephen Lloyd Killion, Lithopolis, OH (US); Adam Jason Burns, Columbus, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,088

(22) Filed: Apr. 25, 2013

(65) Prior Publication Data

US 2013/0234583 A1 Sep. 12, 2013

Related U.S. Application Data

(63) Continuation-in-part of application No. 13/280,570, filed on Oct. 25, 2011, now Pat. No. 8,461,753.

(51) Int. Cl.
*H01J 61/44* (2006.01)
*H01J 9/00* (2006.01)
(Continued)

(52) U.S. Cl.
CPC ............ *H01J 61/44* (2013.01); *C09K 11/7734* (2013.01); *C09K 11/7777* (2013.01); *C09K 11/7787* (2013.01); *H01J 61/48* (2013.01)

(58) Field of Classification Search
None
See application file for complete search history.

(56) References Cited

U.S. PATENT DOCUMENTS 3,602,758 A 8/1971 Thornton et al.
4,079,287 A * 3/1978 Soules et al. ................ 313/487
(Continued)

FOREIGN PATENT DOCUMENTS

CA 2105023 C 5/2003
CA 2105021 C 11/2003
(Continued)

OTHER PUBLICATIONS

PCT Search Report and Written Opinion issued in connection with corresponding Application No. PCT/US2012/055706 on Mar. 12, 2012.

(Continued)

*Primary Examiner* — Ashok Patel
(74) *Attorney, Agent, or Firm* — GE Global Patent Operation; Peter T. DiMauro

(57) ABSTRACT

Described are methods and apparatus for providing fluorescent lamps having a two-layer phosphor coating that includes a base coating and a top coating that economically provides a high color rendering index (CRI) of at least 87 with improved brightness. In an embodiment, a low-pressure discharge lamp includes a light transmissive envelope having a basecoat phosphor layer disposed on an inner surface, wherein the basecoat phosphor layer includes less than ten percent weight of a rare earth phosphor. Also included is a topcoat phosphor layer on a surface of the base coat phosphor layer that includes a blend of at least red, green, green-blue and blue emitting rare earth phosphors, and a fill gas composition within the light transmissive envelope.

30 Claims, 1 Drawing Sheet

(51) Int. Cl.
*C09K 11/77* (2006.01)
*H01J 61/48* (2006.01)

(56) References Cited

U.S. PATENT DOCUMENTS

| | | |
|---|---|---|
| 4,088,923 A | 5/1978 | Manders |
| 4,305,019 A | 12/1981 | Graff et al. |
| 4,623,816 A | 11/1986 | Hoffman et al. |
| 4,705,986 A | 11/1987 | Iwama et al. |
| 4,751,426 A | 6/1988 | Hoffman et al. |
| 4,806,824 A | 2/1989 | Paynter et al. |
| 4,847,533 A | 7/1989 | Hoffman |
| 5,045,752 A | 9/1991 | Jansma |
| 5,309,069 A | 5/1994 | Sigai et al. |
| 5,402,036 A | 3/1995 | Ito |
| 5,714,836 A | 2/1998 | Hunt et al. |
| 5,838,101 A | 11/1998 | Pappalardo |
| 5,854,533 A | 12/1998 | Pappalardo |
| 6,137,217 A | 10/2000 | Pappalardo et al. |
| 6,583,566 B1 | 6/2003 | Jin et al. |
| 7,402,955 B2 | 7/2008 | Chau et al. |
| 8,461,753 B2 * | 6/2013 | Du et al. ............ 313/487 |
| 8,530,098 B2 * | 9/2013 | Kim et al. ............ 429/307 |
| 2003/0155857 A1 | 8/2003 | Soules et al. |
| 2005/0179358 A1 * | 8/2005 | Soules et al. ............ 313/487 |
| 2009/0102391 A1 * | 4/2009 | Beers et al. ............ 315/182 |
| 2009/0309482 A1 * | 12/2009 | Srivastava et al. ............ 313/487 |
| 2010/0102704 A1 * | 4/2010 | Jermann et al. ............ 313/487 |
| 2013/0134862 A1 * | 5/2013 | Du et al. ............ 313/487 |
| 2013/0193835 A1 * | 8/2013 | Cohen et al. ............ 313/487 |
| 2014/0306598 A1 * | 10/2014 | Du et al. ............ 313/487 |

FOREIGN PATENT DOCUMENTS

| | | |
|---|---|---|
| CA | 2537676 A1 | 11/2006 |
| EP | 0594424 A1 | 4/1994 |

OTHER PUBLICATIONS

Unofficial English Translation of Chinese Office Action issued in connection with corresponding CN Application No. 201280064334.4 on Mar. 2, 2015.

* cited by examiner

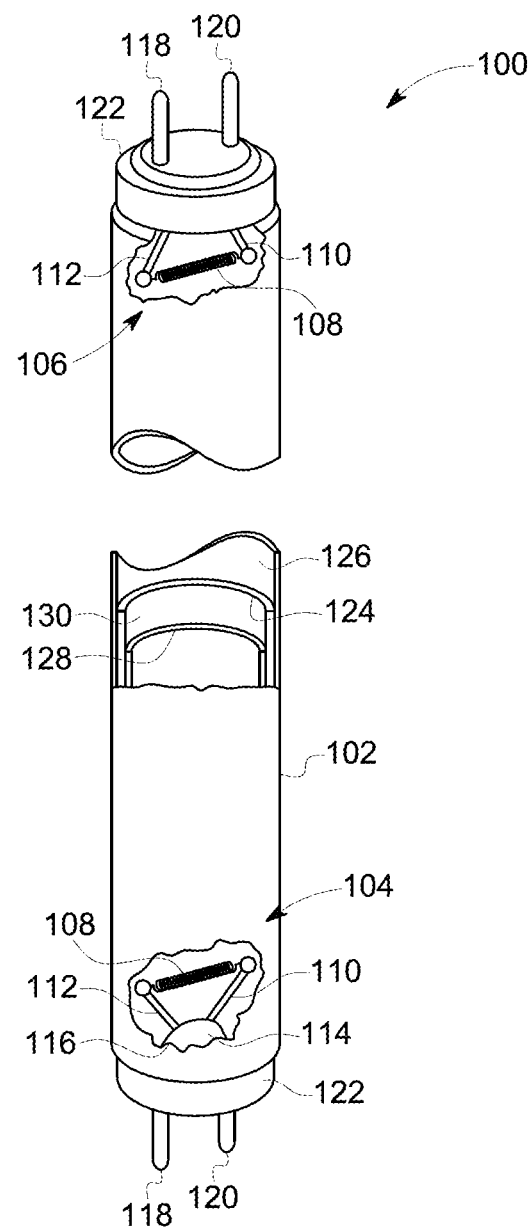

HIGH COLOR RENDERING INDEX FLUORESCENT LAMP WITH MULTI-LAYER PHOSPHOR COATING

CROSS-REFERENCE TO RELATED APPLICATION

This application is a continuation-in-part of prior-filed, commonly owned application Ser. No. 13/280,570, filed 25 Oct. 2011, now allowed. The present application claims priority under 35 USC 120 from said prior-filed, co-pending, commonly owned application. Said prior-filed, co-pending, commonly owned application Ser. No. 13/280,570 is hereby incorporated by reference.

FIELD OF THE INVENTION

Embodiments of the present invention generally relate to fluorescent lamps, and in particular to fluorescent lamps having a two-layer phosphor coating that includes a base coating and a top coating that economically provides a high color rendering index (CRI) of at least 87 with improved brightness.

BACKGROUND OF THE INVENTION

Fluorescent lamps may employ various combinations of three or four narrow band emitting phosphor materials for conversion of ultraviolet (UV) light to visible light. A "phosphor" is a luminescent material that absorbs radiation energy in a portion of the electromagnetic spectrum and emits energy in another portion of the electromagnetic spectrum. Each phosphor material produces a red, a blue or a green color emission, and a combination of phosphor materials may be used, for example, in low pressure type mercury vapor discharge lamps. Crystalline inorganic compounds form an important class of phosphors that are of high chemical purity and of controlled composition to which small quantities of other elements (known as "activators") have been added to convert them into efficient luminescent materials. Phosphors used in low pressure lamps mercury vapor discharge lamps convert ultraviolet (UV) radiation emitted by the excited mercury vapor to visible light.

Typically, a blue color emission phosphor exhibits an emission band in the wavelength range from about 430 nanometers (nm) to about 500 nm, a red color emission phosphor exhibits an emission band in the wavelength range from about 590 nm to about 670 nm, and a green color emission phosphor exhibits an emission band in the wavelength range from about 500 nm to about 600 nm. This phosphor combination produces efficient white light illumination. A blend of four narrow band emitting phosphor materials may include first and second green emitting phosphors having different visible emission spectrum, a third blue emitting phosphor, and a fourth red emitting phosphor. Some conventional phosphor combinations utilized a dual layer phosphor coating. For example, a thin layer of the tri-phosphor combination may be deposited on the surface of a basecoat of conventional calcium haloapatite phosphor material to produce the desired high light output with fair color rendition at a considerable cost savings for the overall phosphor combination. But the color rendering index (CRI) of the basecoat is typically about 70, and the tri-phosphor top layer CRI is typically about 83 and thus the CRI of the basecoat is much lower than that of the topcoat. The combination of the layers therefore results in a CRI of about 78.

Thus, a need exists for energy efficient lamps that provide a CRI of at least 87 while also reducing the cost of utilizing relatively expensive phosphor materials.

SUMMARY OF THE INVENTION

Apparatus and methods are presented for providing fluorescent lamps having a two-layer phosphor coating that includes a base coating and a top coating that economically provides a high color rendering index (CRI) of at least 87 with improved brightness. In an embodiment, a low-pressure discharge lamp includes a light transmissive envelope having a basecoat phosphor layer disposed on an inner surface, wherein the basecoat phosphor layer includes less than ten percent weight of a rare earth phosphor. Also included is a topcoat phosphor layer on a surface of the base coat phosphor layer including a blend of at least red, green, green-blue and blue emitting rare earth phosphors. A fill gas composition is also included within the light transmissive envelope.

In an advantageous embodiment, a method includes providing a light-transmissive envelope having a first electrode on a first end and a second electrode on a second end for exciting a discharge fill contained within an inner cavity, the light-transmissive envelope having an inner surface and an outer surface, and coating the inner surface of the light-transmissive envelope with a basecoat phosphor layer comprising less than ten percent weight of at least one rare earth phosphor. The method also includes coating a surface of the basecoat phosphor layer with a topcoat phosphor layer comprising a blend of a red-emitting rare earth phosphor, a blue-emitting rare earth phosphor, a blue-green-emitting rare earth phosphor, and a green-emitting rare earth phosphor, wherein the topcoat phosphor layer provides a color rendering index (CRI) of greater than 87 and extra lumens.

BRIEF DESCRIPTION OF THE DRAWINGS

Aspects and/or features of the invention and many of their attendant benefits and/or advantages will become more readily apparent and appreciated by reference to the detailed description when taking in conjunction with the accompanying drawing, which drawing may not be drawn to scale.

FIG. 1 is a perspective view partially broken away of a low pressure mercury discharge fluorescent lamp construction to illustrate the multi-layer phosphor coating in accordance with an embodiment of the invention.

DETAILED DESCRIPTION

Described herein are fluorescent lamps (FLs) and methods for making FLs that include a multi-layer phosphor coating to provide a color rendering index (CRI) of 87 or greater, with acceptable brightness at an economical cost. In an embodiment, the multi-layer phosphor coating is formed from a plurality of layers that include at least a basecoat phosphor layer and a topcoat phosphor layer. The basecoat phosphor layer provides a CRI of at least 87 at a pre-selected color temperature, and the topcoat phosphor layer provides a CRI of at least 87 and significantly better lumens than the basecoat phosphor layer. In an embodiment, the basecoat phosphor layer contains less than ten weight percent (10 wt %) of rare-earth phosphor, whereas the topcoat phosphor layer includes at least one of each of red, green, blue and blue-green emitting rare-earth phosphors. For example, the basecoat phosphor layer used alone can produce a CRI of over 90 and about 50 lumens per watt. But by adding a small amount of rare earth phosphor blend as a topcoat phosphor layer the lumens per watt is effectively boosted to over 60 while maintaining the overall lamp CRI to be greater than or equal to 87. Thus, a FL having a CRI of 87 or greater can be provided at a reduced cost in comparison to conventional FLs.

In accordance with some embodiments, the basecoat phosphor layer is an alkaline metal phosphor blend having a strontium red phosphor as the main component, which provides a high CRI. In addition, the topcoat phosphor layer coating material includes a rare-earth phosphor top coating to provide high CRI and extra lumens. Thus, as mentioned above, the combination of such a basecoat phosphor layer and topcoat phosphor layer results in a FL that has a CRI equal to or greater than 87 and a lumens per watt output of 60 or greater (as both the basecoat layer and the topcoat layer have a CRI equal or greater than 87). Accordingly, the CRI of the FL is effectively increased to 87 or more.

The description herein relates to mercury discharge lamps including fluorescent lamps (FLs) that include a sealed light-transmissive envelope having a generally circular cross section for describing embodiments. But it is contemplated that other types and shapes of lamps could be used and are within the scope of this disclosure, including mercury fluorescent lamps, low dose mercury, and high output fluorescent lamps. The lamp may include electrodes or may not include electrodes. The lamp may be linear, but any size, shape or cross section type may be used, including but not limited to fluorescent lamps such as T5, T8, T12, 17 W, 20 W, 25 W, 32 W, 34 W, 40 W, 54 W, 56 W, 59 W, 70 W, linear, circular, 2D, twin tube, or U-shaped fluorescent lamps. The lamps may be high-efficiency or high-output FLs. For example, embodiments can include compact fluorescent lamps (CFLs) having a folded or wrapped topology so that the overall length of the lamp is much shorter or compact than the unfolded length of the glass tube. The varied modes of manufacture and configurations for linear FLs as well as CFLs are generally known to persons skilled in the art.

Correlated color temperature (CCT) is a measure of the warmth or coolness of the color emitted by a lamp, and is measured in units of degrees Kelvin. For example, a lamp having a CCT of 3000 K has about the same color as an ideal blackbody glowing at that temperature. Lamps are manufactured to emit light at a desired CCT by using different phosphors in the basecoat phosphor layer and the topcoat phosphor layer deposited inside a light-transmissive envelope of the FL. Warm-white fluorescent lamps typically have a CCT of about 2700 K, neutral-white FLs have a CCT in the range of about 3000 K to 3500 K, cool-white FLs have a CCT of about 4100 K, and daylight FLs have a CCT in the range of about 5000 K to 7500 K.

For a lamp to achieve a CCT of a given value, it is advantageous to ensure that the CCT of the individual layers are not too far apart, and preferably within about 1000 K of each other. For example, to achieve a target FL of about 5000 K, a basecoat phosphor layer having a CCT of 4500 K could be used along with a topcoat phosphor layer having a CCT of 5500 K, or vice-versa. The ideal situation would be to use the same CCT values for each of the phosphor layers. One skilled in the art understands that CCT and CRI values can be ascribed to individual layers because these values can be ascertained by making the same lamp using only one of the layers. For example, for a FL having only a halophosphor layer, a value for the CCT and CRI of that layer can be determined by examining the light emitted by the lamp using conventional methods. The same can be done for a FL having only a "topcoat" layer that includes at least three rare earth phosphors (that emit red, green and blue light).

The lamp described below with reference to FIG. 1 is a low-pressure discharge lamp (e.g. a fluorescent lamp). Such FLs typically include at least one light-transmissive envelope or discharge tube which can be made of a vitreous (e.g., glass) material and/or ceramic, or any suitable material which allows for the transmission of at least some visible light. A fill-gas composition capable of sustaining an electric discharge is sealed inside the light-transmissive envelope. The lamp shown in FIG. 1 also includes the present novel basecoat and topcoat phosphor layers, which each provide a CRI of 87 or greater, and one or more electrical leads at least partially disposed within the light-transmissive envelope for providing electric current.

FIG. 1 is a perspective view partially broken-away of a low pressure mercury discharge fluorescent lamp 100 according to an embodiment. The FL 100 includes a light-transmissive envelope 102 having a circular cross section, a first low pressure mercury discharge assembly 104, and a second low pressure mercury discharge assembly 106. The first and second low pressure mercury discharge assemblies, 104, 106 are disposed within the light-transmissive envelope 102 on first and second opposing ends of the lamp, and include conventional electrode structures 108 connected to lead-in wires 110 and 112 which extend through a glass press seal 114 in a mount stem 116 to electrical contacts (pins) 118 and 120 of a base 122 fixed at both ends of the sealed light-transmissive envelope 102. A discharge-sustaining fill is sealed within the light-transmissive envelope 102 and may be composed of an inert gas, for example, argon, xenon, neon or krypton at a low pressure in combination with a mercury vapor to provide the low vapor pressure for lamp operation. A basecoat phosphor layer 124 may be disposed onto an inner surface 126 of the light-transmissive envelope 102, and a topcoat phosphor layer 128 may be disposed onto a surface 130 of the basecoat phosphor layer 124. The phrase "disposed onto inner surface 126" is meant to possibly include intervening layers such as barrier layers (not shown) between the inner surface 126 and the basecoat phosphor layer 124. For example, fluorescent lamps may have a layer of a non-luminescent barrier material, such as alumina, which is applied directly onto the inner surface of the light-transmissive envelope, to absorb and/or reflect any escaping UV and to homogenize the appearance of the visible white light escaping therefrom.

The relative amounts of the basecoat phosphor layer and the topcoat phosphor layer may vary, but typically the weight of the basecoat phosphor layer is greater than the weight of the topcoat phosphor layer. In some embodiments, the weight of the basecoat phosphor layer may be in the range of 50-99% of the total weight of the phosphor carried on the lamp (including the weight of the basecoat together with the weight of the topcoat). In other embodiments, the weight of the basecoat phosphor layer may be in the range of 70-99% of the total weight of the phosphor carried on the lamp.

In some embodiments, the basecoat phosphor layer 124 includes at least one non-rare earth phosphor, and less than 10% weight (wt) of a rare-earth phosphor. In some implementations, the rare earth phosphor in the basecoat phosphor layer can be in the range of about one weight percentage (1 wt %) to about 10 wt %, and in some implementations the rare earth phosphor in the basecoat phosphor layer can be in the range of about 4 wt % to about 8 wt %. In addition, the topcoat phosphor layer includes red, green, blue and blue-green emitting rare earth phosphors. In some embodiments, the topcoat phosphor layer can be in the range of about 1 wt % to 50 wt % of the total coating weight, which includes the coating weights of the basecoat phosphor layer and topcoat phosphor layer. Some embodiments include a topcoat phosphor layer in the range of about 10 wt % to about 30 wt % of the total coating weight. In some implementations, in addition to the rare earth phosphors, the topcoat layer also includes a white halophosphor. In some embodiments, the main component in the basecoat phosphor layer is an alkaline metal phosphor blend. In a specific example, the basecoat phosphor layer main component is a strontium red phosphor.

As used herein, a "non-rare-earth phosphor" is a phosphor which is not activated by a rare-earth element. It is intended to be a broad term that potentially includes halophosphors (such as alkaline metal phosphors) or other phosphors which are not rare-earth phosphors but are not strictly halophosphors, such as zinc silicate or strontium red, and the like. As used herein, the term "halophosphor" is intended to encompass phosphors that include at least one halogen component (such as chlorine or fluorine, or a mixture thereof) but which are not activated by a rare earth element. Chemically, a halophosphor may be a phosphate or a halophosphate of an alkaline earth metal. Examples of halophosphate-containing halophosphors include calcium halophosphates, strontium halophosphates, and barium halophosphates.

A halophosphor may emit a color upon excitation, or may emit light perceived to be white. For example, a blue emitting halophosphor may include a calcium halophosphate (such as fluorophosphate) activated with antimony (3+). Other non-rare earth activated phosphors may include one or more of strontium red and strontium blue.

As mentioned above, according to some embodiments the topcoat phosphor layer 128 includes the following rare earth phosphors: a red-emitting rare earth phosphor, a blue-emitting rare earth phosphor, a green-emitting rare earth phosphor, and a blue-green emitting rare earth phosphor. A red-emitting rare earth phosphor may include one or more of: a europium-doped yttrium oxide (e.g., YEO); a europium-doped yttrium vanadate-phosphate (e.g., $Y(P,V)O_4$:Eu); a metal pentaborate doped with at least cerium (e.g., CBM), a europium-doped borophosphate, a cerium-doped yttrium aluminate (e.g., YAG) or the like. A blue-emitting rare earth phosphor may include one or more of: a europium-doped halophosphate (e.g., SECA), and a europium-doped magnesium aluminate (e.g., BAM, which can also be represented as: $BaMgAl_{10}O_{17}$:$Eu^{2+}$). A green-emitting rare earth phosphor may include a cerium- and terbium-coactivated phosphor (e.g., LAP or CAT), or may be CBT ($GdMgB_5O_{10}$:$Ce^{3+}$, $Tb^{3+}$). A blue-green-emitting rare earth phosphor may include a europium- and manganese-coactivated magnesium aluminate (e.g., BAMn), and a europium-doped strontium aluminate (e.g., SAE) or the like. A cerium- and terbium-coactivated phosphor may be a cerium- and terbium-doped lanthanum phosphate.

In some embodiments, the topcoat phosphor layer 128 includes a red-emitting rare earth phosphor (such as YEO, $Y(P,V)O_4$:Eu, CBM or YAG), a blue-emitting rare earth phosphor (such as SECA), and a special BAMn. The special BAMn takes the place of the green-emitting and the blue-green-emitting rare earth phosphors of the embodiments described above. In an implementation, the special BAMn is: $(Ba,Sr,Ca)(Mg_{1-x}Mn_x)Al_{10}O_{17}$:$Eu^{2+}$, where x ranges from 0.026-0.049. This implementation therefore forgoes utilizing BAM ($BaMgAl_{10}O_{17}$:$Eu^{2+}$) in the formulation of the topcoat phosphor layer.

A blue phosphor may have a peak emission of about 440 to 500 nanometers (nm); a green phosphor may have a peak emission of about 500 to 600 nm; a blue-green phosphor may have a peak emission of about 480 to 505 nm; and a red phosphor may have a peak emission of about 610 to 670 nm (for certain red phosphors, there may be one or more peaks as low as 590 nm).

A low pressure discharge lamp in accordance with embodiments disclosed (such as the FL 100 of FIG. 1) may generally be constructed by any effective method, including many known or conventional methods. Some non-limiting examples of materials that may comprise the discharge fill of such lamps include at least one material selected from, but not limited to, Hg, Na, Zn, Mn, Ni, Cu, Al, Ga, In, Tl, Sn, Pb, Bi, Ti, V, Cr, Zr, Nb, Mo, Hf, Ta, W, Re, Os, Ne, Ar, He, Kr, Ze and combinations and compounds thereof. In some embodiments the discharge fill material includes mercury, while in other embodiments the discharge fill is mercury-free. For example, when a substantially mercury-free discharge fill is desired, the discharge fill may include, but not be limited to, gallium halide, a zinc halide, an indium halide, and the like. The discharge fill may be present at any effective pressure that sustains a low-pressure discharge, as can be ascertained by one skilled in the art. Some suitable pressures may include a total fill pressure of from about 0.1 kPa to about 30 kPa. In some embodiments, a total fill pressure may exceed 30 kPa or may be lower than 0.1 kPa.

Referring again to FIG. 1, the basecoat phosphor layer 124 and topcoat phosphor layer 128 may be applied or disposed onto the inner surface 126 of the light-transmissive envelope 102 using any effective method, including conventional methods such as slurrying. Methods of preparing and applying phosphor coating slurries are generally known in the art. For example, the components of the basecoat phosphor layer 124 may be coated as a layer onto the inner surface 126 of the light-transmissive envelope 102 (which inner surface 126 may be carrying a barrier layer). A phosphor coating suspension is prepared by dispersing the desired topcoat phosphor particles in a water-based system that may include binders, for example, polyethylene oxide and hydroxyethyl cellulose, with water as the solvent. The phosphor suspension is applied by causing the suspension to flow down inner surface 126. Evaporation of the water results in an insoluble layer of phosphor particles adhering to the inside surface 126 of the light-transmissive envelope 102. Basecoat phosphor layer 124 is then dried prior to over-coating with the components of the topcoat phosphor layer 128. The topcoat phosphor layer 128 is similarly applied from a second water-based suspension that contains the appropriate and desired blend of phosphors. The second water-based suspension is allowed to flow over the surface 130 of the basecoat phosphor layer 124 until the liquid is drained from the light-transmissive envelope 102.

A vapor discharge lamp may include from 1 g (e.g., 1 mg/cm$^2$) to about 6 g (e.g., 6 mg/cm$^2$) of the phosphor coating. For example, a four foot (4 ft.) T8 fluorescent lamp may use from about 1 g to about 4 g per bulb of phosphor coating, and a 4 ft. T12 fluorescent lamp may use from about 1 g to about 6 g per bulb of phosphor coating.

Some example embodiments in accordance with this disclosure are provided in the tables below:

Topcoat Layer

First Embodiment

| COMPOSITION | WEIGHT PERCENTAGE |
|---|---|
| Europium-Doped Yttrium Oxide (YEO) | 47% |
| Cerium- and Terbium-Coactivated Lanthanum Phosphate (LAP) | 17% |
| Europium-doped Magnesium Aluminate (BAM) | 8% |
| Europium- and Manganese-Coactivated Barium Magnesium Aluminate (BAMn) | 8% |
| White-Halo | 20% |

Topcoat Layer

Second Embodiment

| COMPOSITION | WEIGHT PERCENTAGE |
|---|---|
| Europium-Doped Yttrium Oxide (YEO) | 59% |
| Cerium- and Terbium-Coactivated Lanthanum Phosphate (LAP) | 25% |
| Europium-doped Magnesium Aluminate (BAM) | 10% |
| Europium- and Manganese-Coactivated Barium Magnesium Aluminate (BAMn) | 6% |

Basecoat Layer

| COMPOSITION | WEIGHT PERCENTAGE |
|---|---|
| Strontium Red | 72% |
| Blue Halo | 21% |
| Europium- and Manganese-Coactivated Magnesium Aluminate (BAMn) | 7% |

In the present disclosure, when a layer is described as being "on" or "over" another layer or substrate, it is to be understood that the layers can either be directly contacting each other or have another layer or feature therebetween, unless expressly stated to the contrary. Thus, such terms are simply describing the relative position of the layers to each other and do not necessarily mean "on top of" since relative position above or below depends on the orientation of the device to the viewer.

The above description and/or the accompanying drawing is not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A low-pressure discharge lamp comprising:
a light transmissive envelope;
a basecoat phosphor layer disposed on an inner surface of the light transmissive envelope, the basecoat phosphor layer comprising less than ten weight percent of a rare earth phosphor;
a topcoat phosphor layer disposed on a surface of the base coat phosphor layer comprising a blend of at least red, green, green-blue and blue emitting rare earth phosphors; and
a fill gas composition operable to sustain a discharge sealed inside the light transmissive envelope;
wherein the basecoat phosphor layer and the topcoat phosphor layer provide a lamp having a Color Rendering Index (CRI) value of at least 87.

2. The lamp of claim 1, wherein the topcoat phosphor layer further comprises a white-halo.

3. The lamp of claim 1, wherein the basecoat phosphor layer comprises strontium red, blue-halo and BAMn.

4. The lamp of claim 1, wherein the topcoat layer comprises YEO, LAP, BAM and BAMn.

5. The lamp of claim 1, wherein the topcoat layer comprises YEO, LAP, BAM, BAMn and white-halo.

6. The lamp of claim 1, wherein the topcoat layer comprises YEO, LAP and special BAMn.

7. The lamp of claim 6, wherein the special BAMn comprises $(Ba,Sr,Ca)(Mg_{1-x}Mn_x)Al_{10}O_{17}:Eu^{2+}$, wherein x ranges from 0.026-0.049.

8. The lamp of claim 1, wherein the lamp exhibits an overall CRI value greater than 87.

9. The lamp of claim 1, wherein the topcoat phosphor layer exhibits a higher lumen output than the basecoat phosphor layer at the same level of excitation.

10. The lamp of claim 1, wherein the CRI of the topcoat phosphor layer and the CRI of the basecoat phosphor layer are greater or equal to 87.

11. The lamp of claim 1, wherein the CCT of the basecoat phosphor layer and the CCT of the topcoat phosphor layer are within about 1000 K of each other.

12. The low-pressure discharge lamp of claim 1, wherein the green-blue emitting rare earth phosphor comprises europium- and manganese-coactivated barium magnesium aluminate (BAMn).

13. The lamp of claim 1, wherein the basecoat layer comprises a rare earth phosphor in the range of about 4 wt % to about 8 wt %.

14. The lamp of claim 1, wherein the topcoat phosphor layer comprises rare earth phosphors in the range of about 1 wt % to about 50 wt % of the total coating weight that includes the basecoat phosphor layer and the topcoat phosphor layer.

15. The lamp of claim 1, wherein the topcoat phosphor layer comprises rare earth phosphors in the range of about 10 wt % to about 30 wt % of the total coating weight that includes the basecoat phosphor layer and the topcoat phosphor layer.

16. A method of forming a fluorescent lamp, comprising:
providing a light-transmissive envelope having a first electrode on a first end and a second electrode on a second end for exciting a discharge fill contained within an inner cavity of the light-transmissive envelope to produce light, the light-transmissive envelope having an inner surface and an outer surface;

coating the inner surface of the light-transmissive envelope with a basecoat phosphor layer comprising less than ten weight percent of at least one rare earth phosphor; and coating a surface of the basecoat phosphor layer with a topcoat phosphor layer comprising a blend of a red-emitting rare earth phosphor, a blue-emitting rare earth phosphor, a blue-green-emitting rare earth phosphor, and a green-emitting rare earth phosphor, wherein the topcoat phosphor layer provides a color rendering index (CRI) of greater than 87 and extra lumens.

17. The method of claim 16, wherein the basecoat phosphor layer further comprises at least one non-rare earth activator phosphor.

18. The method of claim 17, wherein the non-rare earth activator phosphor comprises a blue halophosphor and strontium red.

19. The method of claim 16, wherein the topcoat phosphor layer further comprises a white-halo.

20. The method of claim 16, wherein the basecoat phosphor layer comprises a composition of strontium red, blue-halo and BAMn.

21. The method of claim 16, wherein the topcoat layer comprises a composition of YEO, LAP, BAM and BAMn.

22. The method of claim 16, wherein the topcoat layer comprises a composition of YEO, LAP, BAM, BAMn and white-halo.

23. The method of claim 16, wherein the topcoat layer comprises a composition of YEO, LAP and special BAMn.

24. The method of claim 23, wherein the special BAMn comprises $(Ba,Sr,Ca)(Mg_{1-x}Mn_x)Al_{10}O_{17}:Eu^{2+}$, wherein x ranges from 0.026-0.049.

25. The method of claim 16, wherein the lamp exhibits an overall CRI greater than 87.

26. The method of claim 16, wherein the basecoat phosphor layer and the topcoat layer exhibit a CRI of at least about 87.

27. The method of claim 16, wherein coating the inner surface of the light-transmissive envelope further comprises coating the inner surface with a basecoat phosphor layer including a rare earth phosphor in the range of about 1 wt % to less than about 10 wt % of the basecoat phosphor layer.

28. The method of claim 16, wherein coating the inner surface of the light-transmissive envelope further comprises coating the inner surface with a basecoat phosphor layer including a rare earth phosphor in the range of about 4 wt % to about 8 wt % of the basecoat phosphor layer.

29. The method of claim 16, wherein coating a surface of the basecoat phosphor layer further comprises coating the surface of the basecoat phosphor layer with a topcoat phosphor layer including rare earth phosphors in the range of about 1 wt % to about 50 wt % of the total coating weight that includes the basecoat phosphor layer and the topcoat phosphor layer.

30. The method of claim 16, wherein coating a surface of the basecoat phosphor layer further comprises coating the surface of the basecoat phosphor layer with a topcoat phosphor layer including rare earth phosphors in the range of about 10 wt % to about 30 wt % of the total coating weight that includes the basecoat phosphor layer and the topcoat phosphor layer.

* * * * *